(12) United States Patent
Rueffer

(10) Patent No.: US 12,381,898 B2
(45) Date of Patent: Aug. 5, 2025

(54) MITIGATING MALICIOUS NETWORK TRAFFIC

(71) Applicant: FRONTIER COMMUNICATIONS HOLDINGS, LLC, Dallas, TX (US)

(72) Inventor: Eddie Rueffer, Allen, TX (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 628 days.

(21) Appl. No.: 17/719,071

(22) Filed: Apr. 12, 2022

(65) Prior Publication Data

US 2023/0328085 A1 Oct. 12, 2023

(51) Int. Cl.
*H04L 29/06* (2006.01)
*H04L 9/40* (2022.01)

(52) U.S. Cl.
CPC ...... *H04L 63/1425* (2013.01); *H04L 63/0236* (2013.01); *H04L 63/1416* (2013.01); *H04L 63/145* (2013.01)

(58) Field of Classification Search
CPC ............ H04L 63/0236; H04L 63/1416; H04L 63/1425; H04L 63/145
See application file for complete search history.

(56) References Cited

U.S. PATENT DOCUMENTS

| | | | |
|---|---|---|---|
| 2018/0351993 A1* | 12/2018 | Lee | H04L 63/0227 |
| 2020/0007548 A1* | 1/2020 | Sanghavi | H04L 45/748 |
| 2020/0382537 A1* | 12/2020 | Compton | H04L 63/1416 |

* cited by examiner

*Primary Examiner* — Rodman Alexander Mahmoudi
(74) *Attorney, Agent, or Firm* — MARSHALL, GERSTEIN & BORUN LLP

(57) ABSTRACT

Disclosed herein are system, method, and computer program product embodiments for mitigating malicious network traffic. A computing device (e.g., a network management device, a control device, etc.) may receive indications of data/information communicated by one or more devices within a network and cause the one or more devices to implement measures to block malicious traffic resulting from multi-vector cyberattacks.

20 Claims, 5 Drawing Sheets

MITIGATING MALICIOUS NETWORK TRAFFIC

BACKGROUND

A multi-vector and/or polymorphic cyberattack is an attempted infiltration of a network using multiple entry points and various methods, such as volumetric attacks, application layer attacks, state and/or protocol exhaustion attacks, and/or the like. These cyberattacks, when conducted, generate malicious network traffic that occupies the bandwidth of public and private networks, causing damaging effects such as data breaches, miscommunications, corruption/loss of data, and/or the like. Conventional methods for mitigating cyberattacks address specific network entry points but are unable to address multi-vector cyberattacks, executed in sequence and/or simultaneously, at multiple network points and/or network devices. For example, even if a multi-vector cyberattack is detected by conventional malicious traffic mitigation systems and/or solutions, the rate at which the vectors change ensures that conventional malicious traffic mitigation systems and/or solutions cannot engage mitigation fast enough to prevent damaging effects from the vectors. To account for malicious traffic generated by multi-vector cyberattacks, network providers, service providers, network engineers, and/or network capacity planners must routinely expand networks far beyond what is required to support legitimate network traffic, for example, by provisioning the networks with excess high-bandwidth communication channels supporting network devices, elements, and/or components—which is an extremely costly endeavor. Conventional systems require constant and manual reconfiguring of network devices, elements, and/or components in response to these varying vectors of cyberattacks—which can be overly daunting, error-prone, time-consuming, and ultimately ineffective. These and other shortcomings are addressed by aspects described herein.

SUMMARY

It is to be understood that both the following general description and the following detailed description are exemplary and explanatory only and are not restrictive. Methods and systems for mitigating malicious network traffic are described.

According to some aspects, described are computer-implemented methods comprising determining, by a computing device (e.g., a network management device, a control device, etc.), a respective source address for each data packet of a plurality of data packets. The computing device may cause, based on the respective source address for each data packet of a first portion of the plurality of data packets indicating a prohibited source address, the first portion of the plurality of data packets to be blocked. The computing device may cause, based on a source address indicated by each data packet of a second portion of the plurality of data packets and a communication request threshold, the second portion of the plurality of data packets to be blocked. The computing device may cause, based on a respective destination address of each data packet of a third portion of the plurality of data packets and an access control list, the third portion of the plurality of data packets to be blocked. The computing device may cause, based on a respective size of each data packet of a fourth portion of the plurality of data packets and a packet size threshold, the fourth portion of the plurality of data packets to be blocked. The computing device may cause, based on the respective content of each data packet of a fifth portion of the plurality of data packets indicating a restricted content type, the fifth portion of the plurality of data packets to be blocked. The computing device may cause, based on a destination address of remaining data packets of the plurality of data packets, the remaining data packets to be sent to a user device. The computing device may cause, based on traffic profile information and parameter indicated by a header of a data packet of the remaining data packets, the user device to block the data packet.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1A:
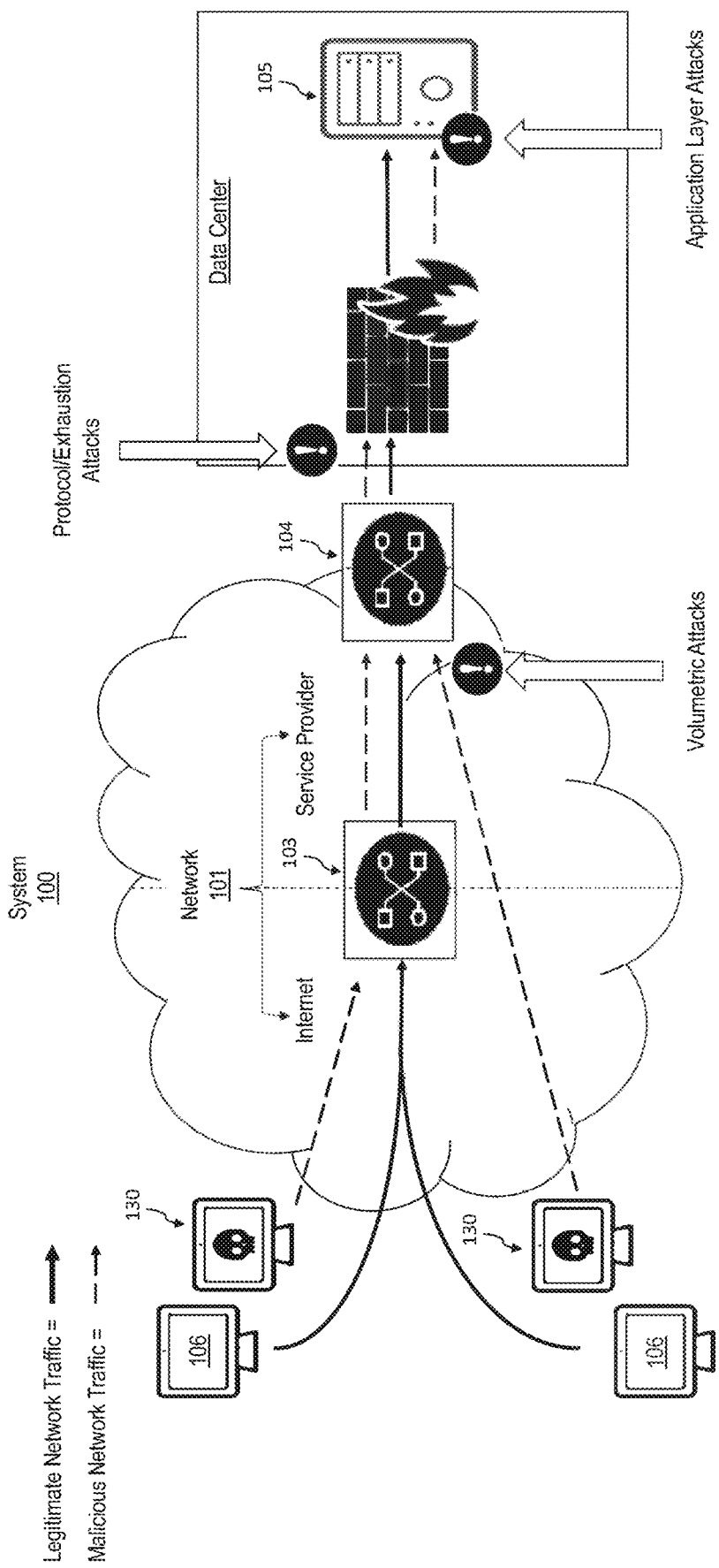
FIG. 1A shows a diagram of an example system affected by malicious network traffic, according to some aspects of this disclosure.

Provided herein are system, apparatus, device, method, and/or computer program product embodiments, and/or combinations and sub-combinations thereof, for mitigating malicious network traffic. The system, apparatus, device, method, and/or computer program product embodiments, and/or combinations and sub-combinations thereof facilitate multi-layered malicious network traffic mitigation based implementation of specific measures (e.g., ingress filtering, source-based data rate limiting, access control, network data rate liming, deep packet analysis, traffic control, metric monitoring, etc.) at each layer to address different vectors of a multi-vector cyberattack. The system, apparatus, device, method, and/or computer program product embodiments, and/or combinations and sub-combinations thereof enable immediate detection and mitigation of malicious network traffic, for example, preventing the malicious network traffic from significantly affecting legitimate network traffic and/or propagating/traversing through a network (e.g., a service provider network, a private network, etc.).

According to some aspects, a computing device (e.g., a server, a cloud-based device, a central device, a control device, etc.) may be in communication with each of a plurality of devices, elements, and/or components within a network (e.g., public network, private network, virtual network, etc.) that facilitate the transmission of data/information between a source device and a target device. The computing device may monitor and/or inspect traffic (e.g., data packets, etc.), bandwidth consumption, and/or any number of operations associated with communicating data/information between the plurality of devices, elements, and/or components for indications of malicious traffic caused by at least one vector of a multi-vector cyberattack. For example, the computing device may determine whether data/information received by a network device/component is from a restricted source and/or indicated a restricted content and/or protocol type, whether an indicated source and/or destination of data/information is also indicated by an access control list and/or the like, whether network traffic exceeds a threshold associated with normal communication activities and/or a defined data/information rate, and/or any other indications of malicious traffic. Thresholds for permitted data/information rates, indications of permitted content and/or protocol types, data access control lists, and/or the like may be determined and/or set by the computing device, for example, according to any number of operating parameters and requirements of a service provider and/or end-user (e.g., a user device, a service subscriber, a business entity, etc.). The thresholds for permitted data/information rates, indications of permitted content and/or protocol types, data access control lists, and/or the like may be communicated to each of the plurality of devices, elements, and/or components within the network to facilitate blocking of malicious network traffic.

The methods and systems for mitigating malicious network traffic provide improvements over conventional systems. The multi-layered malicious network traffic mitigation measures described herein may be implemented in a particular sequence, with each layer configured to filter different types of traffic (e.g., based on different indications of malicious activity, etc.). According to some aspects, a sequence for implementing malicious network traffic mitigation measures may be based on historic malicious network traffic mitigation measures, a current indication of a type of cyberattack, a recommendation from a predictive model, and/or the like. The multi-layered malicious network traffic mitigation measures described herein enable, based on different types of cyberattacks, different data filters to be implemented that mitigate malicious network traffic at different Open Systems Interconnection (OSI) layers without impact to an overall system and/or affecting legitimate network traffic (e.g., data communicated between a source and a target device, etc.).

For example, the methods and systems described enable blocking of malicious traffic that, based on being generated by different vector types, routinely evade detection by conventional systems. For example, the methods and systems described herein facilitate mitigation of protocol (e.g., transmission control protocol (TCP), etc.) attacks where nefarious actors/devices send more protocol connection requests than a network device, such as a server and/or the like, can handle by blocking traffic and/or packets failing to adhere to a rate limit. The methods and systems described herein facilitate mitigation of volumetric attacks where nefarious actors/devices send excessive amounts of random data to saturate the bandwidth of a target device by again blocking traffic and/or packets failing to adhere to a rate limit. The methods and systems described herein facilitate mitigation of application layer attacks where nefarious actors/devices send malformed/crafted traffic (request) and/or packets targeting specific application vulnerabilities and/or issues (resulting in the application not being able to deliver content to a user) by blocking traffic and/or packets indicating application layer related content. The methods and systems described herein facilitate mitigation of stateful attacks where nefarious actors/devices send excessive amounts of fragmented packets/requests (e.g., TCP or User Datagram Protocol (UDP) fragments, etc.) to a target device causing the target device to maintain a state by blocking traffic and/or packets indicative of a content type (e.g., SYN requests) and/or exceeding a rate limit. According to some aspects, the methods and systems described herein facilitate appropriate mitigation of malicious network traffic without impact to legitimate traffic. For example, the methods and systems described herein may block and/or prevent malicious network traffic at the ingress of a network such that a minimal amount, if any, of the malicious network traffic ever propagates through and/or traverses the network. The methods and systems described enable capacity planning for networks to be minimized such that networks do not have to be provisioned with excess high-bandwidth communication channels and/or network devices, elements, components, etc. to support additional malicious network traffic by blocking the malicious network traffic at ingress and/or its target. These and other advantages are described herein.

According to some aspects, FIG. 1A shows a system 100 experiencing malicious network traffic. The system 100 may include a network 101. The network 101 may include a packet-switched network, for example, the Internet, in communication with a service provider network. The service provider network may include an Internet protocol-based network, a non-packet switched network (e.g., quadrature amplitude modulation based network), and/or the like. The network 101 may include network adapters, switches, routers, modems, and the like connected through wireless (e.g., radiofrequency, satellite, etc.) links, physical links (e.g., fiber optic cable, coaxial cable, Ethernet cable, etc.), and/or combinations thereof. The network 101 may include public networks, private networks, wide area networks, local area networks, and/or the like. The network 101 may be configured to be in communication with one or more of a network device 103, a network component 104, an end device 105, data sources 106, and/or the like.

According to some aspects, a data source 106 may include a user device (e.g., a mobile device, a smart device, an Internet-of-Things (IoT) device, a computing device, etc.), an application programming interface (API), a technical resource, and/or any other data source. The data sources 106 may be in communication, for example, via a direct connection or one or more intermediary devices and/or access points (not shown), with the network device 103. According to some aspects, although two data sources 106 is shown, the system 100 may include any number of data sources. The data sources 106 may send (and/or receive) data/information (e.g., legitimate network traffic, etc.) to the end device 105. For example, data source 106 may send (and/or receive) data/information (e.g., legitimate network traffic, etc.) to the end device 105 that is routed to one or more user devices (e.g., mobile devices, smart devices, computing devices, terminal devices, etc.), such as a user device 108 of FIG. 1B, in communication with the end device 105.

According to some aspects, the network device 103 may include a routing device, a gateway device, a server, and/or the like for communicating with the data source 106, the end device 105, and/or any other device/component of the system 100 to provide data and/or services. For example, network device 103 may provide services such as network (e.g., Internet) connectivity, media management (e.g., media server), content services, streaming services, broadband services, or other network-related services. The network device 103 may allow the data sources 106 to interact with remote resources such as data, devices (e.g., computing device 102 of FIG. 1B, network component 104, user device 105, etc.), and files. According to some aspects, although only network device 103 is shown, the system 100 may include any number of network devices.

According to some aspects, the network component 104 may include any device, module, and/or the like communicatively coupled to the network 101. For example, the network component 104 may include a router, a switch, a gateway, a network access point and/or location (e.g., tap), and/or the like. The network component 104 may provide an entry/exit point to the network 101 for data/information sent/received to/from the end device 105.

According to some aspects, the end device 105 may be a modem (e.g., cable modem), a router, a gateway, a switch, a network terminal (e.g., optical network unit), and/or the like. The end device 105 may be configured for communication with the network 101 via a variety of protocols, such as Internet protocol, transmission control protocol (TCP), file transfer protocol, session initiation protocol, voice over internet protocol, and/or the like. According to some aspects, the end device 105 may include and/or be in communication with a network access point (not shown). The network access point may provide a user-managed network (e.g., local area network), a service provider-managed network (e.g., a public network for users of the service provider), and/or the like. As described, according to some aspects, the end device 105 may provide access to network 101 to user devices, such as the user device 108 of FIG. 1B.

According to some aspects, the system 100 may include nefarious actor(s) 130 (e.g., malicious device(s), botnets, etc.). The system 100 may include any number of nefarious actors 130. According to some aspects, the nefarious actors 13 may include a single actor. According to some aspects, the nefarious actors 130 may include multiple actors. The nefarious actors 130 may attempt to compromise the network 101 and/or any device/component of the system 100, such as the network device 103, the network component 104, the end device 105, the data sources 106, and/or the like by generating and/or transmitting/sending malicious network traffic.

For example, according to some aspects, the nefarious actor(s) 130 may initiate volumetric attacks (e.g, Internet Control Message Protocol (ICMP) flood attacks, IP/ICMP fragmentation attacks, IP Security (IPSec) flood attacks, UDP flood attacks, reflection amplification attacks, etc.) against the network component 104 and/or the like. Volumetric attacks aim to overwhelm network capacity with significantly high volumes (e.g., 800 Gbps or more) of malicious network traffic. The volumetric attacks may aim to consume the bandwidth within the service provider portion of the network 101 and/or between the service provider portion of the network 101 and the Internet. According to some aspects, the nefarious actor(s) 130 may initiate volumetric attacks to disguise attempts to penetrate and/or expose services within the service provider portion of the network 101 such as disabling firewalls and/or intrusion prevention systems, installing malware, and/or stealing data/information.

According to some aspects, the nefarious actor(s) 130 may initiate application-layer attacks against the end device 105 and/or the like. An application-layer attack is routinely a low-volume stealth attack intended to crash application servers and/or the like. According to some aspects, the nefarious actor(s) 130 may initiate protocol/exhaustion attacks aimed at the end device 105, network component 104, and/or any other device/component of the system 100. For example, the nefarious actor(s) 130 may send excessive amounts of fragmented packets/requests (e.g., TCP or UDP fragments, etc.) to the network component 104, the end device 105, etc. causing the network component 104, the end device 105, and/or the like to maintain a state.

According to some aspects, the methods and systems for mitigating malicious network traffic described herein may be used to thwart the attack efforts of the nefarious actor(s) 130 and/or manage the capacity of the system 100. For example, by implementing the methods and systems for mitigating malicious network traffic described herein excessive costs associated with network expansion to accommodate malicious network traffic may be significantly reduced and/or avoided. By implementing the methods and systems for mitigating malicious network traffic described herein provisioning the network 101 with excess high-bandwidth communication channels supporting network devices, elements, and/or components may be prevented.

Figure 1B:
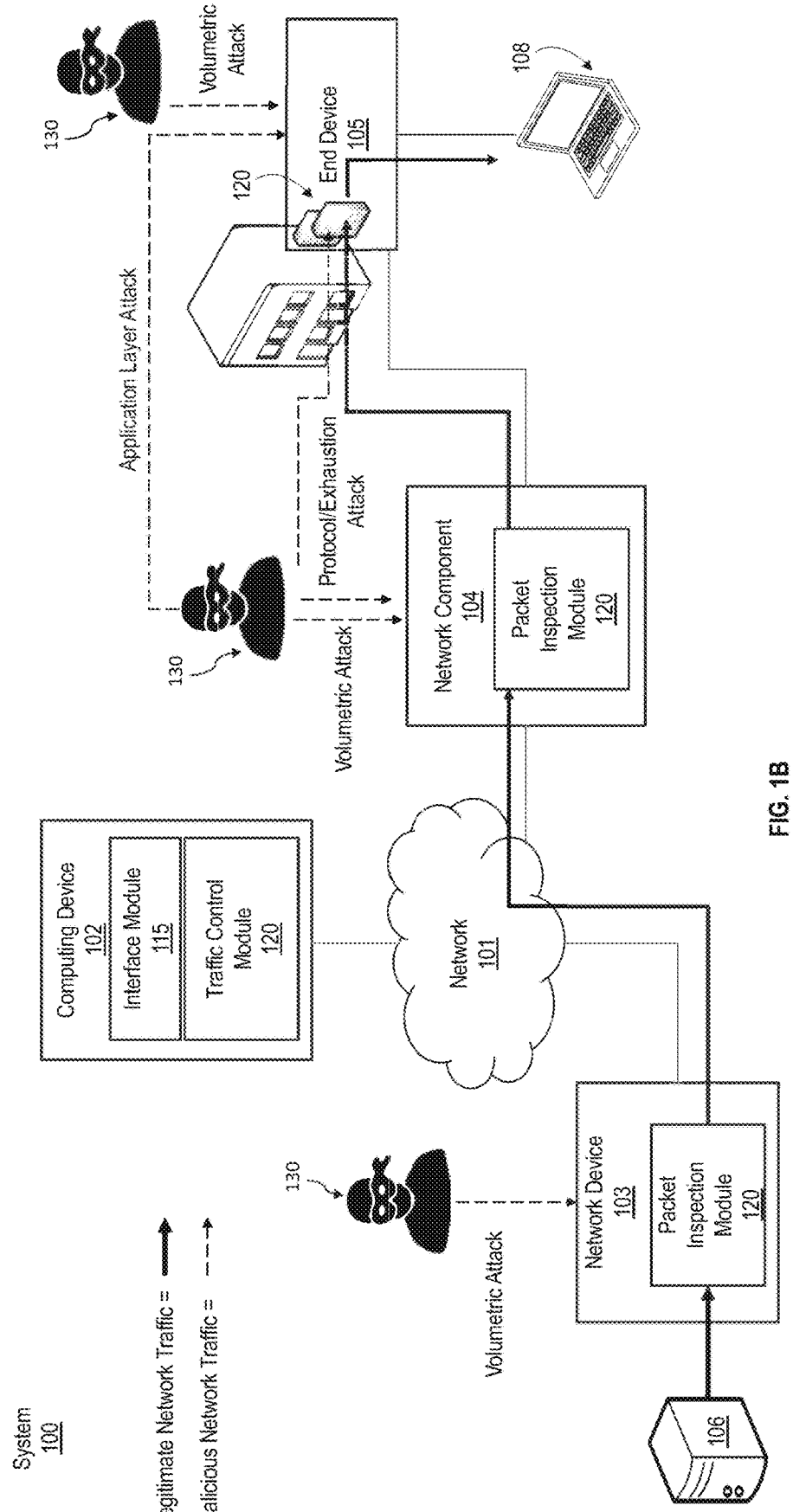
FIG. 1B shows a block diagram of an example system for mitigating malicious network traffic, according to some aspects of this disclosure.

According to some aspects, FIG. 1B shows a block diagram of the system 100 configured to mitigate malicious network traffic. The system 100 may support multi-layered malicious network traffic mitigation based implementation of specific measures (e.g., ingress filtering, source-based data rate limiting, access control, network data rate liming, deep packet analysis, traffic control, metric monitoring, etc.) at each layer to address different vectors of a multi-vector cyberattack. According to some aspects, multi-layered malicious network traffic mitigation measures may be implemented in a particular sequence, with each layer configured to filter different types of traffic (e.g., based on indications of malicious activity, etc.). One skilled in the art will appreciate that provided herein is a functional description and that the respective functions may be performed by software, hardware, or a combination of software and hardware.

According to some aspects, a computing device 102, the network device 103, the network component 104, the end device 105, the data source 106, and/or any other device/component of the system 100 may each be associated with a respective identifier. The identifier may identify, a user, device, location, service, class, group, subscription, and/or the like. The identifier may be any identifier, token, character, string, hash, or the like. The identifier may be configured to differentiate one or more users, devices, and/or components of the system 100 from other users, devices, and/or components of the system 100. The identifier may include device information (e.g., manufacturer, model, type of device), network information (e.g., network address, internet protocol address, media access content identifier), service information (e.g., service provider, service tier, business class, subscription), state information (e.g., idle, active), location information (e.g., country, geographic region), a label, a classifier, and/or the like. The identifier may be dynamic, static, temporary, and/or persist for a specified or unspecified time. According to some aspects, the respective identifier for each device/component of the system 100 may be used to communicate, determine, select, etc. malicious network traffic mitigation data/information, malicious network traffic mitigation controls/procedures, and/or the like.

According to some aspects, the network device 103, the network component 104, the end device 105, the data sources 106, and/or any other device/component of the system 100 may each be associated with and/or managed by a single entity (e.g., service provider, business entity, device manager, user, etc.). According to some aspects, the network device 103, the network component 104, the end device 105, the data sources 106, and/or any other device/component of the system 100 may each be associated with different and/or separate entities (e.g., service providers, business entities, device managers, users, etc.). According to some aspects, operations of the network device 103, the network component 104, the end device 105, the data sources 106, and/or any other device/component of the system 100 may each be associated with different entities. For example, the computing device 102, the network device 103, the network component 104, the end device 105, the data sources 106, and/or any other device/component of the system 100 may each be configured with an application that enables different entities to access and/or control operations of the respective device that are used to implement a layer of the multi-layered methods/procedures to mitigate malicious network traffic described herein. According to some aspects, the ability of an entity to access and/or control operations devices/components of the system 100 may be based on various access, authentication, and/or pet missions schemes/procedures. For example, certain entities may be authorized and/or responsible for implementing (e.g., via the computing device 102, etc.) a layer of the multi-layered methods/procedures to mitigate malicious network traffic described herein.

According to some aspects, the computing device 102 (e.g., a server, a cloud-based device, a central device, a control device, etc.) may facilitate, implement, and/or perform multi-layer protective measures to mitigate malicious network traffic generated by different vectors of a multi-vector cyberattack (e.g., denial of service (DOS), distributed denial of service (DDOS), etc.) propagating through network 101 and/or affecting one or more devices/components of the system 100. For example, each layer of the multi-layer methods to mitigate malicious network traffic may be implemented according to the type of vector of a multi-vector cyberattack that is experienced, detected, determined, and/or anticipated without affecting legitimate network traffic communicated throughout the system 100. Although only the computing device 102 is shown, according to some aspects, the computing device may include multiple computing devices, for example, communicatively coupled and/or operating together/collectively.

According to some aspects, the computing device 102 may comprise an interface module 115. The interface module may include software, hardware, and/or user interfaces to provide an interface to a user to interact with the computing device 102 and/or each device and/or component of the system 100, such as the network device 103, the network component 104, and/or the end device 105. According to some aspects, the interface module 115 may be any interface for presenting information to the user (e.g., indications of legitimate and/or malicious network traffic from any device/component of the system 100, etc.). According to some aspects, the interface module 115 may be any interface for receiving information that may be communicated to any device and/or component of the system 100, such as the network device 103, the network component 104, and/or the end device 105. For example, the interface module 115 may be any interface for receiving device/component control settings, data rate and/or packet size threshold information (e.g., data rate-limiting information and/or instructions, etc.), network device/component access control information for protocol and/or ports, restricted data source/destination and/or content type information. The interface module 115 may be any interface for receiving settings, metrics, and/or intelligence used to validate legitimate and/or clean network traffic, implementing patching/version control, tuning application and/or malicious traffic mitigation methods, and/or receiving/evaluating any other data/information used to insolate devices/components of the system 100 for malicious cyberattacks.

According to some aspects, the interface module 115 may display an indication of the operations and/or communications of each device/component of the system 100. According to some aspects, interaction with the interface module 115 may cause data/information (e.g., commands, controls, instructions, etc.) to be sent to each device and/or component of the system 100 (e.g., the network device 103, the network component 104, the end device 105, etc.) to facilitate and/or implement different layers of the multi-layered malicious network traffic mitigation procedures described herein. According to some aspects, the interface module 115 may display automatic operations and/or actions performed by the computing device 102 to mitigate malicious network traffic, such as sending of data/information (e.g., commands, controls, instructions, etc.) to each device and/or component of the system 100 (e.g., the network device 103, the network component 104, the end device 105, etc.) to facilitate and/or implement different layers of the multi-layered malicious network traffic mitigation procedures described herein. According to some aspects, data/information (e.g., commands, controls, instructions, etc.) sent to devices and/or components of the system 100 (e.g., the network device 103, the network component 104, the end device 105, etc.) to facilitate and/or implement different layers of the multi-layered malicious network traffic mitigation procedures described may be sent to the devices and/or components of the system 100 synchronously and/or asynchronously.

According to some aspects, the computing device 102 may include a traffic control module 119. The traffic control module 119 may receive data/information (e.g., telemetry data, etc.) indicative of operations and/or communications performed by each device and/or component of the system 100, such as the network device 103, the network component 104, and/or the end device 105. According to some aspects, the computing device may monitor and/or inspect traffic (e.g., data packets, etc.), bandwidth consumption, and/or any number of operations associated with communicating data/information between each device and/or component of the system 100, such as the network device 103, the network component 104, and/or the end device 105 for indications of malicious traffic caused by at least one vector of a multi-vector cyberattack. According to some aspects, the computing device 102 may detect and/or determine malicious traffic based on data/information (e.g., telemetry data, etc.) from the devices and/or components of the system 100 that indicates network traffic that deviates from an acceptable level (e.g., a constant bitrate, a normal data rate, etc.) and/or satisfies/exceeds a threshold, network traffic that deviates (e.g., exceeds, etc.) from a normal/routine level of traffic communicated by a device and/or component of the system 100, network traffic that matches a defined (e.g., user-defined, predictive model determined, service provider and/or third-party entity determined, etc.) threat pattern and/or traffic profile.

For example, according to some aspects, each device and/or component of the system 100, such as the network device 103, the network component 104, and/or the end device 105 may include a traffic inspection module 120. The traffic inspection modules 120 may each include packet sniffers, firewalls, command-line packet analyzers, analysis applications, and/or the like, respectively, to monitor, inspect, record, etc. any data/information communicated by the respective device and/or component. According to some aspects, the traffic inspection modules 120 may each send indications and/or notifications of any data/information communicated by the respective device and/or component to the traffic control module 119 of the computing device 102.

According to some aspects, the computing device 102 may determine whether data/information received/transmitted by a network device/component is from a restricted source and/or indicated a restricted content and/or protocol type, whether an indicated source and/or destination of data/information is also indicated by an access control list and/or the like, whether network traffic exceeds a threshold associated with normal communication activities and/or a defined data/information rate, and/or any other indications of malicious traffic. Thresholds for permitted data/information rates, data/packet sizes, indications of permitted content and/or protocol types, data access control lists, and/or the like may be determined and/or set by the computing device, for example, according to any number of operating parameters and requirements of a service provider and/or end-user (e.g., a user device, a service subscriber, a business entity, etc.). The thresholds for permitted data/information rates, indications of permitted content and/or protocol types, data access control lists, and/or the like may be communicated to each of the plurality of devices, elements, and/or components within the network to facilitate blocking of malicious network traffic.

For example, the computing device 102 may determine and implement different layers of multi-layer methods to mitigate malicious network traffic that each facilitate and/or enable blocking of malicious traffic, across different OSI layers, that routinely evades detection by conventional systems based on being generated by different vector types. According to some aspects, the computing device 102 may determine and/or select a layer of the multi-layer methods to mitigate malicious network traffic that facilitates and/or enables mitigation of volumetric attacks against a device/component of the system 100, such as the network component 104, where the nefarious actor 130 sends excessive amounts of random data to saturate the bandwidth of network component 104 by causing traffic and/or packets failing to adhere to a rate limit to be blocked, dropped, ignored, and/or discarded. As described, the rate limit may be determined and/or set by the computing device 102 and implemented at the end device 105 and/or the network component 104. According to some aspects, the end device 105, the network component 104, and/or the like may block, drop, ignore, and/or discard traffic and/or packets failing to adhere to a rate limit.

According to some aspects, the end device 105, the network component 104, and/or the like may route any traffic and/or packets failing to adhere to a rate limit to the computing device 102. The computing device 102 may block, drop, ignore, and/or discard traffic and/or packets. For example, according to some aspects, the computing device 102 may be configured to operate as a data-scrubbing device for the system 102.

According to some aspects, the computing device 102 (e.g., the traffic control module 119, etc.) may determine and implement a layer of multi-layered malicious network traffic mitigation measures that facilitates and/or enables blocking of malicious traffic sent to the end device 105 by a nefarious actor 130. For example, if the nefarious actor 130 generates and/or send excessive quantities of data/information to a particular port of the end device 105, such as excessive quantities of mail messages (e.g., via Simple Mail Transfer Protocol (SMP), etc.) on port 25 of the end device 105 and/or denial of service (DOS) attack traffic on port 53, the traffic inspection module 120 may analyze the frequency, count, and/or any other indicator of traffic against a traffic threshold (e.g., received and/or set by the computing device 102, etc.), and send the frequency, count, and/or any other indicator of traffic against a traffic threshold to the computing device 102. For example, if traffic and/or a content type indicated by the network traffic (e.g., packets, etc.) from the same device (e.g., IP address, host-name, etc.), such as the nefarious actor 130 exceeds a threshold, a signal and/or information may be sent to computing device 102 regarding the triggering event. The signal and/or information may include the IP address, source port, and/or destination port of the nefarious actor 130 attempting to spam the end device 105.

According to some aspects, the computing device 102 (e.g., the traffic control module 119, etc.) may receive the signal and/or information from the end device 105 and trigger another layer of the mitigation measures via any number of actions to mitigate the malicious traffic from the nefarious actor 130. For example, the computing device 102 may cause the end device 105 to set a bandwidth restriction policy on data/information (e.g., data packets, etc.) received from nefarious actor 130. According to some aspects, the policy restriction may be limited to the port or other interface associated with the malicious traffic. According to some aspects, data packets associated with the malicious traffic may be tagged with a Type of Service marking and/or the like so that any packet sent from the nefarious actor 130 to a particular port (e.g., port 25) of the end device 105 may be blocked, dropped, ignored, and/or discarded.

According to some aspects, the computing device 102 may determine and implement a layer of multi-layered malicious network traffic mitigation measures that facilitates and/or enables mitigation of protocol (e.g., transmission control protocol (TCP), etc.) attacks against a device/component of the system 100, such as the network device 103, the end device 105, and/or the network component 104, where a nefarious actor 130 sends more protocol connection requests than the network device 103, the end device 105, and/or the network component 104 can handle by causing protocol connection requests traffic failing to adhere to a rate limit to be blocked, dropped, ignored, and/or discarded.

According to some aspects, the computing device 102 may determine and implement a layer of multi-layered malicious network traffic mitigation measures that facilitates and/or enables mitigation of application layer and/or volumetric attacks against a device/component of the system 100, such as the network device 103, the network component 104, and/or the like where a nefarious actor 130 sends malformed/crafted traffic (request) and/or packets targeting specific application vulnerabilities and/or issues (resulting in the application not being able to deliver content to the user device 108). For example, the layer of the multi-layered malicious network traffic mitigation measures may facilitate and/or enable blocking traffic and/or packets indicating application layer related content (e.g., HTTP GET, HTTP POST, etc.). According to some aspects, heuristic flow analysis performed by the traffic inspection module 120 of the network device 103 may determine if application layer data (e.g., HTTP flood data, etc.) received warrants notification to the computing device 102 to implement protection procedures. Protection procedures may include, for example, causing the network device 103, the network component 104, and/or the like to implement blocking of malicious traffic via rate limiting and/or the like. According to some aspects, the malicious traffic may be blocked according to a buffering/bucketing algorithm. For example, the network device 103, the network component 104, and/or the like may receive instructions from the computing device 102 to remove a token from an amount of tokens in a bucket for each data packet received that is a defined size. According to some aspects, the network device 103, the network component 104, and/or the like may block packets (e.g., received from the nefarious actor 130 based on the amount of tokens remaining in the bucket being less than a token count threshold.

According to some aspects, the computing device 102 may determine and implement a layer of multi-layered malicious network traffic mitigation measures that facilitates and/or enables mitigation of stateful attacks (protocol/exhaustion attack) where a nefarious actor 130 sends excessive amounts of fragmented packets/requests (e.g., TCP or UDP fragments, etc.) to the network component 104, the end device 105, etc. causing the network component 104, the end device 105, and/or the like to maintain a state. For example, the computing device 102 may cause the network component 104, the end device 105, and/or the like to block traffic and/or packets indicative of a content type (e.g., SYN requests) and/or that exceed a rate limit. According to some aspects, the computing device 102 may provide the network component 104, the end device 105, and/or the like with a stateful session flow information and/or the like. The stateful session flow information may include the source and destination addresses, port numbers, protocol sequencing (e.g., TCP sequencing, etc.) information, and additional flags for each protocol (e.g., TCP, UDP, etc.) connection associated with a particular session. According to some aspects, the traffic inspection module 120 of the network component 104, the end device 105, and/or the like may use the stateful session flow information to generate a connection object used by its firewall to compare all inbound and outbound packets against session flows in the stateful session flow information. The firewall of the traffic inspection module 120 may permit data only if an appropriate connection exists to validate the passage of that data.

According to some aspects, for yet another layer of the mitigation measures, the computing device 102 may send instructions and/or metrics for a device/component of the system 100, such as the end device 105, etc. to apply to intelligence used to validate legitimate and/or clean network traffic. For example, the computing device 102 may provide the end device 105 traffic profile information that indicates instructions and/or metrics for validating legitimate and/or clean network traffic by indicating information such as protocols (e.g., prohibited protocols, etc.) the end device 105 should block, ignore, and/or reject. Traffic profile information may indicate ports (e.g., prohibited ports, etc.) at which if the end device 105 received data/information (e.g., data packets, requests for connection, etc.) should block, ignore, and/or reject. According to some aspects, the end device 105 may extract information from a traffic profile, determine parameters received data packets (e.g., data within headers of received data packets, etc.) that indicate at least a protocol or a destination port, and block any data packets with parameters that indicate prohibited protocols or the prohibited destination ports.

According to some aspects, the traffic control module 119 may include a trained predictive model and/or machine learning engine. According to some aspects, to determine, select, and/or implement a layer or a sequence of layers of multi-layered malicious network traffic mitigation measures, the traffic control module 119 may receive a recommendation from the trained predictive model and/or machine learning engine of the traffic control module 119. For example, as described, computing device 120 may receive indications and/or notifications of any data/information communicated by a device and/or component of the system 100. The trained predictive model and/or machine learning engine of the traffic control module 119 may extract elements from the indications and/or notifications of data/information communicated by a device/component, for example, such as an identifier of the device/component, a transmitted/received data rate, an amount of requests for/from a particular protocol, source/destination addresses, and/or the like. The computing device 120 may use the identifier of the device/component to determine ground truth data elements for the device/component (e.g., an acceptable data rate, an allowable amount of requests for/from a particular protocol, authorized source/destination addresses, etc.). The trained predictive model and/or machine learning engine of the traffic control module 119 may recommend a layer or a sequence of layers of multi-layered malicious network traffic mitigation measures based on a degree of correspondence between the elements from the indications and/or notifications of data/information communicated by a device/component and the ground truth data elements for the device/component. The trained predictive model and/or machine-learning engine of the traffic control module 119 may implement any algorithm for selecting/determining and recommending an optimal layer or a sequence of layers of multi-layered malicious network traffic mitigation measures.

According to some aspects, the computing device 102 may use indications of data/information communicated by any device/component of the system 100 and cause the device/component to implement measures to block malicious traffic resulting from any multi-vector cyberattacks executed by the nefarious actors 130. Each layer of the multi-layered malicious network traffic mitigation measures significantly reduces a portion of the total amount of malicious network traffic affecting the system 100. According to some aspects, the computing device 102 may implement one or more of the layers described above in a specific sequence on in any combination based on the type of detected cyberattack.

Figure 2:
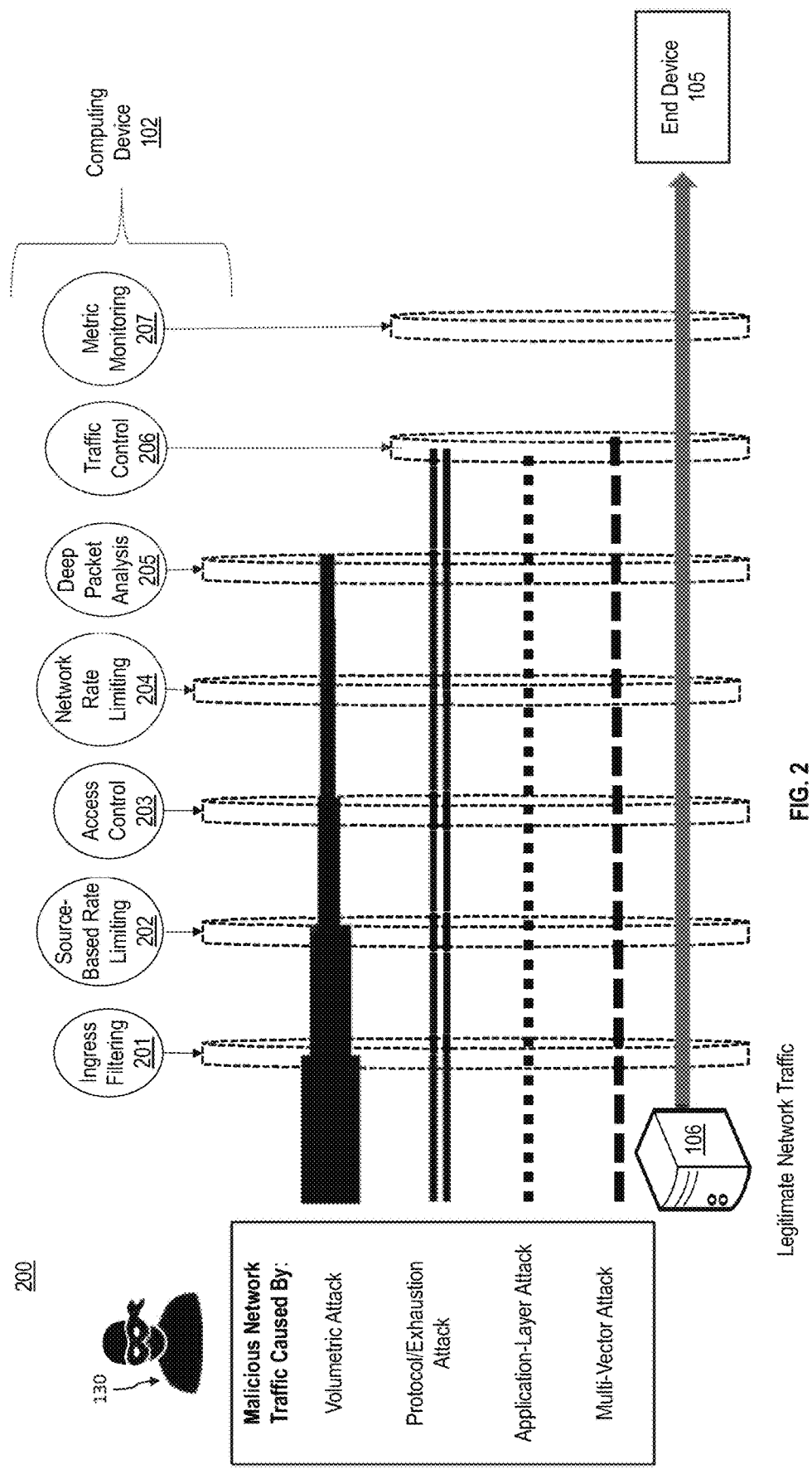
FIG. 2 shows a diagram describing example operations performed by a computing device communicating with system devices/components to mitigate malicious network traffic, according to some aspects of this disclosure.

FIG. 2 is an example diagram 200 describing measures performed by the computing device 102 of FIG. 1B communicating with devices/components of the system 100 to mitigate malicious network traffic, according to some aspects of this disclosure. As described, a nefarious actor 130 may execute various vectors of a multi-vector cyberattack against the network 101 and/or device/components communicatively coupled to the network 101 and/or supporting/facilitating the transfer of data/information between device/components communicatively coupled to the network 101, such as the data source 106 and the end device 105. The computing device 102 may perform multi-layered measures 201-208 to mitigate malicious network traffic. According to some aspects, the computing device 102 may dynamically adjust how traffic is mitigated across each layer of the mitigation measures. Examples of adjustment include, but are not limited to, activating or deactivating certain layers, activating layers so that they filter traffic in a specific sequence, and assigning control of each layer to different entities in an enterprise. Accordingly, although a particular sequence of layered measures (e.g., 201-208) is depicted in FIG. 2, one would understand that the layered measures may be implemented in a different sequence.

In 201, as a layer of the multi-layer methods, the computing device 102 mitigates a significant portion of malicious network traffic caused by a volumetric attack by the nefarious actor 130 by causing devices/components of the system 100 to implement ingress filtering. For example, according to some aspects, the computing device 102 may send one or more signals and/or instructions that cause the network device 103 and/or the network component 104 to block data packets according to a source address. Spoofed packets (e.g., data packets with false source addresses, etc.) are commonly used to carry out denial of service (DoS) attacks, exploit network and system vulnerabilities and gain unauthorized access to data. Blocking data packets based on respective source addresses provides anti-spoofing protection to the system 100. As shown in FIG. 2, ingress filtering may be less effective in mitigating protocol/exhaustion attacks and/or application layer attacks than mitigating volumetric attacks.

In 202, as another layer of the multi-layer methods for mitigating malicious traffic generated by the nefarious actor 130, the computing device 102 may cause devices/components of the system 100 (e.g., the network device 103, the network component 104, etc.) to implement source-based rate limiting (SBRL). SBRL may prevent congestion of packets (e.g., generated by a DoS attack, etc.) on a forwarding processor (FP) of device/component of the system 100 (e.g., the network device 103, the network component 104, etc.) to a Route Processor (RP) interface of the device/component. According to some aspects, the computing device 102 may send one or more signals and/or instructions that cause the device/component of the system 100 (e.g., the network device 103, the network component 104, etc.) to block data packets based on an indicated source address and a communication request threshold. Once a number of communication requests, data packets, and/or the like received with the source address satisfy/exceed the communication request threshold, further communication requests, data packets, and/or the like received with the source address may be blocked. As shown in FIG. 2, SBRL is effective mitigating protocol/exhaustion attacks, application layer attacks, and/or volumetric attacks.

In 203, as another layer of the multi-layer methods for mitigating malicious traffic generated by the nefarious actor 130, the computing device 102 may cause devices/components of the system 100 (e.g., the network device 103, the network component 104, the end device 105, etc.) to implement one or more access control lists and/or the like. According to some aspects, the computing device 102 may send access control list information and/or the like to the devices/components of the system 100 (e.g., the network device 103, the network component 104, the end device 105, etc.) that cause the devices/components to filter specific types of traffic to and from specific locations. The devices/components may use the access control information and/or the like to block/control traffic by protocol, source address, and/or destination address of the data packets. For example, the devices/components may block received data packets that comprise a destination address that is not indicated by the access control information and/or the like. As shown in FIG. 2, access control list implementation is effective in mitigating protocol/exhaustion attacks, application layer attacks, and/or volumetric attacks.

In 204, as another layer of the multi-layer methods for mitigating malicious traffic generated by the nefarious actor 130, the computing device 102 may cause devices/components of the system 100 (e.g., the network device 103, the network component 104, etc.) to implement network rate limiting. The computing device 102 may cause devices/components of the system 100 (e.g., the network device 103, the network component 104, etc.) to implement bandwidth thresholds, data packet-size thresholds, and/or the like. According to some aspects, the computing device 102 may send data rate limiting (e.g., bandwidth thresholds, data packet-size thresholds, etc.) information and/or the like to the devices/components of the system 100 that implement leaky bucket data rate-limiting algorithms where a token is removed from tokens in a bucket for each data packet received that exceeds a packet size threshold. The network device may then block each data packet received that exceeds the packet size threshold based on the number of tokens remaining in the bucket being less than a token count threshold. The computing device 102 may send information and/or instructions to any network device/component of the system 100 that cause the device/component to implement rate limiting based malicious traffic mitigation measures. As shown in FIG. 2, network rate limiting is effective for mitigating protocol/exhaustion attacks and application layer attacks. Network rate limiting is significantly effective in mitigating volumetric attacks.

In 205, as another layer of the multi-layer methods for mitigating malicious traffic generated by the nefarious actor 130, the computing device 102 may cause devices/components of the system 100 (e.g., the network device 103, the network component 104, etc.) to implement deep packet analysis. Deep packet analysis evaluates the header and content of a data packet that is transmitted through the devices/components. Deep packet analysis may be used to determine the contents of data packets and determine where the data packets came from, such as the service or application that sent it and/or the nefarious 130. Based on deep packet analysis control information received from the computing device 102, devices/components of the system 100 (e.g., the network device 103, the network component 104, etc.) may determine (e.g., via the traffic inspection module 120, etc.) any non-compliance to protocol, spam, viruses, intrusions, and any other defined criteria to prevent the data packet from passing through the devices/components. For example, data packets received indicating a restricted content type, protocol type, and/or the like may be blocked, ignored, discarded, and/or the like. As shown in FIG. 2, the implementation of deep packet analysis is effective in mitigating protocol/exhaustion attacks and application layer attacks. The implementation of deep packet analysis is effective in blocking all malicious traffic generated by volumetric attacks.

In 206, as another layer of the multi-layer methods for mitigating malicious traffic generated by the nefarious actor 130, the computing device 102 may cause devices/components of the system 100 (e.g., the end device 105, etc.) to implement traffic control. According to some aspects, the computing device 102 may send a traffic profile to devices/components of the system 100 (e.g., the end device 105, etc.) to implement traffic control. A traffic profile may be used to scrub "dirty" traffic and provide protection at Open Systems Interconnection (OSI) layers 3, 4, and 7 via analysis of the protocol and/or port by which data is received. A traffic profile may indicate allowable protocols and/or ports by which data may be received. For example, devices/components of the system 100 (e.g., the end device 105, etc.) may block data packets based on traffic profile information and a parameter indicated by a header of the data packets indicating a protocol or a port number prohibited by the traffic profile.

In 207, as another layer of the multi-layer methods for mitigating malicious traffic generated by the nefarious actor 130, the computing device 102 may cause devices/components of the system 100 (e.g., the network device 103, the network component 104, etc.) to implement metric monitoring to compare received network traffic with permissible metrics. If data received fails to adhere to defined metrics, a notification may be sent to the computing device 102. The computing device 102 may then determine an appropriate method and/or layer of the multi-layer methods for mitigating any malicious network traffic.

Figure 3:
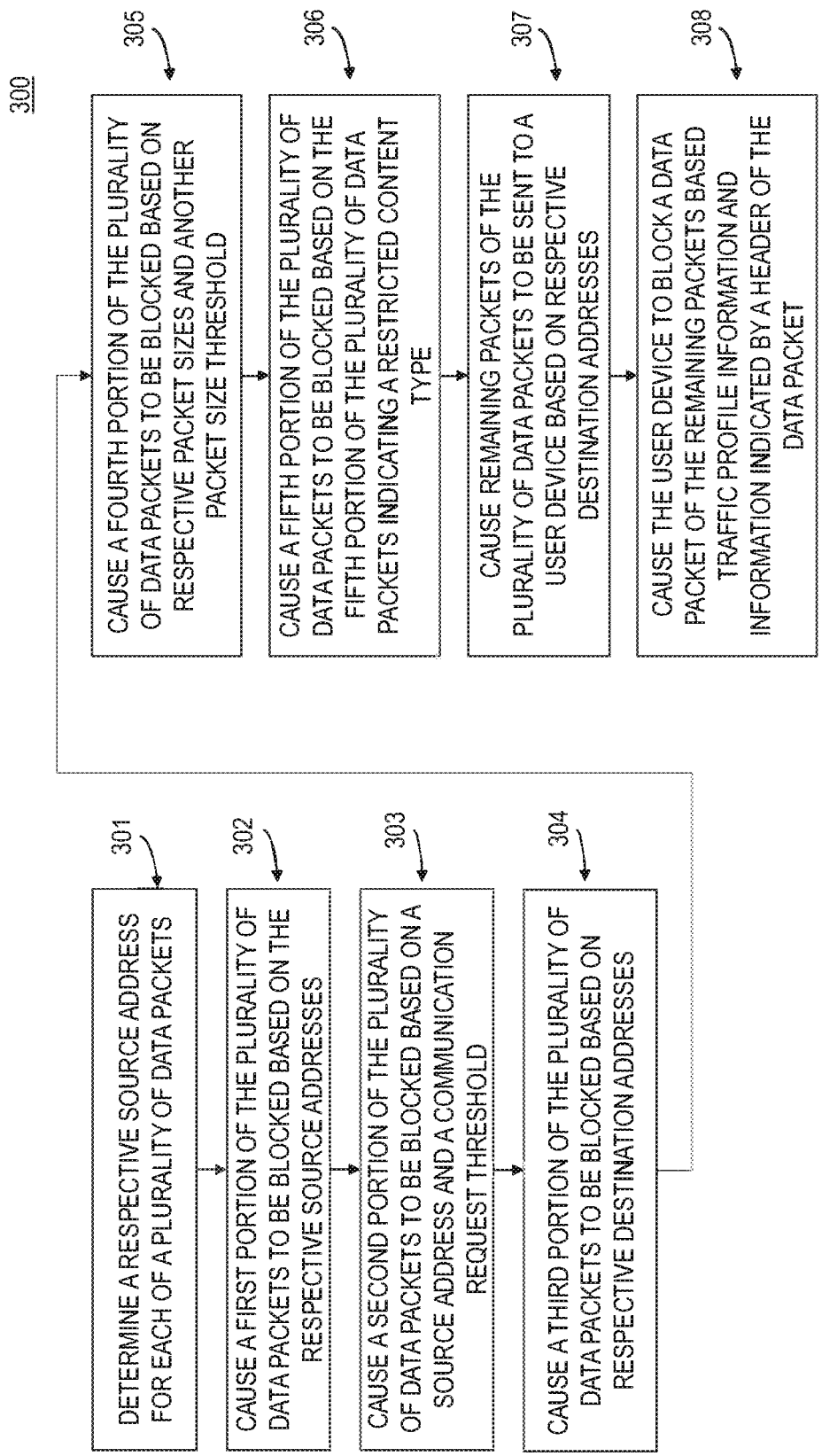
FIG. 3 is a flowchart of an example method for mitigating malicious network traffic, according to some aspects of this disclosure.

FIG. 3 is a flowchart for a method 300 for mitigating malicious network traffic, according to some aspects of this disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1A, 1B, and 2. However, method 300 is not limited to those examples.

In 301, computing device 102 determines a respective source address for each data packet of a plurality of data packets. For example, the computing device 102 may determine the respective source address for each data packet of the plurality of data packets by receiving an indication of the respective source address for each data packet of the plurality of data packets from a network device such as a network routing device, a gateway device, a network component, and/or the like.

In 302, the computing device 102 causes a first portion of the plurality of data packets to be blocked. For example, the computing device 102 causes the first portion of the plurality of data packets to be blocked based on the respective source address for each data packet of the first portion of the plurality of data packets indicating a prohibited source address. The computing device 102 may cause the first portion of the plurality of data packets to be blocked by sending a control message to a network routing device, a gateway device, a network component, and/or the like that received the plurality of data packets. The control message may cause the network routing device, gateway device, network component, and/or the like to block the first portion of the plurality of data packets.

In 303, the computing device 102 causes a second portion of the plurality of data packets to be blocked. For example, the computing device 102 causes the second portion of the plurality of data packets to be blocked based on a source address indicated by each data packet of a second portion of the plurality of data packets and a communication request threshold. The computing device 102 may send data rate limiting instructions to a network device that cause the network device to block received data packets that indicate the source address after the communication request threshold is satisfied.

In 304, the computing device 102 causes a third portion of the plurality of data packets to be blocked. The computing device 102 causes the third portion of the plurality of data packets to be blocked based on a respective destination address of each data packet of the third portion of the plurality of data packets and an access control list. The computing device 102 may cause the third portion of the plurality of data packets to be blocked by sending the access control list to a network device configured to block received data packets that comprise a destination address that is not indicated by the access control list.

In 305, the computing device 102 causes a fourth portion of the plurality of data packets to be blocked. For example, the computing device 102 causes the fourth portion of the plurality of data packets to be blocked based on a respective size of each data packet of the fourth portion of the plurality of data packets and a packet size threshold. The computing device 102 may cause the fourth portion of the plurality of data packets to be blocked by sending, to a network device, instructions to remove a token from an amount of tokens in a bucket for each data packet received that is a defined size. The instructions from the computing device 102 may cause the network device to block the fourth portion of the plurality of data packets based on an amount of tokens remaining in the bucket being less than a token count threshold.

In 306, the computing device 102 causes a fifth portion of the plurality of data packets to be blocked. For example, the computing device 102 causes the fifth portion of the plurality of data packets to be blocked based on respective content of each data packet of the fifth portion of the plurality of data packets indicating a restricted content type. The computing device 102 causes the fifth portion of the plurality of data packets to be blocked by sending, to a network device, an indication of the restricted content type. For example, the network device may be configured to determine, based on a respective header for each data packet of the fifth portion of the plurality of data packets, the respective content. The network device may block the fifth portion of the plurality of data packets based on the respective content of each data packet of the fifth portion of the plurality of data packets indicating a restricted content type.

In 307, the computing device 102 causes remaining data packets of the plurality of data packets to be sent to a user device. For example, the computing device 102 causes the remaining data packets to be sent to the user device based on a destination address of the remaining data packets of the plurality of data packets.

In 308, the computing device 102 causes the user device to block a data packet of the remaining data packets. For example, the computing device 102 causes the user device to block the data packet based on traffic profile information and a parameter indicated by a header of a data packet of the remaining data packets. The computing device 102 may cause the user device to block the data packet by sending the traffic profile information to the user device. The traffic profile information may indicate at least one of a prohibited protocol or a prohibited port number. The user device may be configured to determine, based on the header on the data packet, the parameter. The user device may block the data packet based on the parameter indicating the prohibited protocol or the prohibited port number.

Figure 4:
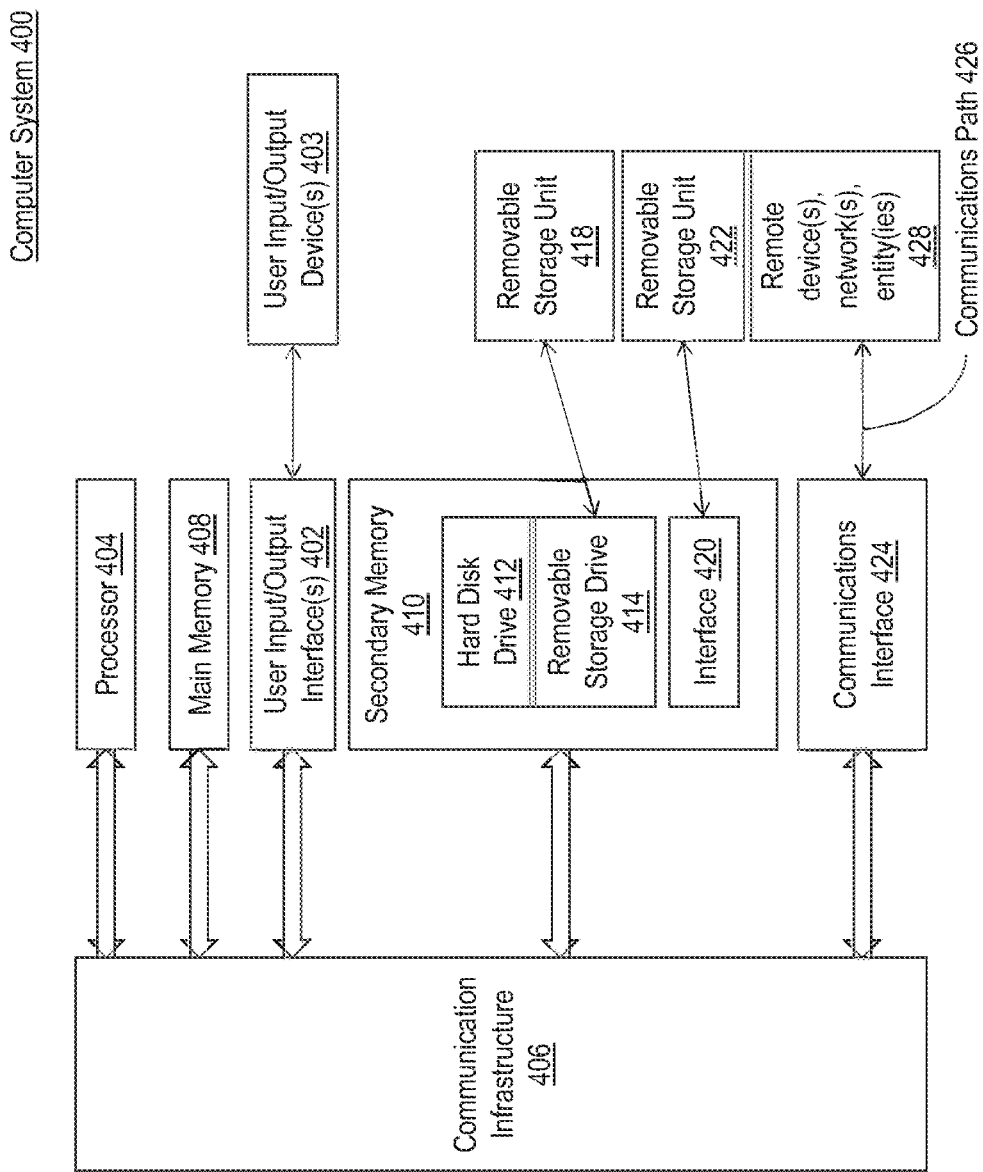
FIG. 4 is an example computer system useful for implementing various aspects of this disclosure.

FIG. 4 is an example computer system useful for implementing various embodiments. Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof. According to some aspects, the computing device 102 of FIG. 1 (and/or any other device/component described herein) may be implemented using the computer system 400. According to some aspects, the computer system 400 may be used to implement method 300 and/or any other method/procedure described herein.

Computer system 400 may include one or more processors (also called central processing units, or CPUs), such as a processor 404. Processor 404 may be connected to a communication infrastructure or bus 406.

Computer system 400 may also include user input/output device(s) 402, such as monitors, keyboards, pointing devices, etc., which may communicate with communication infrastructure or bus 406 through user input/output device(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, a tape backup device, and/or any other storage device/drive.

Removable storage drive 414 may interact with a removable storage unit 418. The removable storage unit 418 may include a computer-usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to the removable storage unit 418.

Secondary memory 410 may include other means, devices, components, instrumentalities, and/or other approaches for allowing computer programs and/or other instructions and/or data to be accessed by computer system 400. Such means, devices, components, instrumentalities, and/or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 4. In particular, embodiments can operate with software, hardware, and/or operating system implementations other than those described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some aspects of this disclosure can be described using the expression "coupled" and "connected" along with their derivatives. These terms are not necessarily intended as synonyms for each other. For example, some aspects of this disclosure can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for mitigating malicious network traffic, comprising:
   determining, by a computing device, a respective source address for each data packet of a plurality of data packets;
   blocking, based on the respective source address for each data packet of a first portion of the plurality of data packets indicating a prohibited source address, the first portion of the plurality of data packets;
   blocking, based on a source address indicated by each data packet of a second portion of the plurality of data packets and a communication request threshold, the second portion of the plurality of data packets;
   blocking, based on a respective destination address of each data packet of a third portion of the plurality of data packets and an access control list, the third portion of the plurality of data packets;
   blocking, based on a respective size of each data packet of a fourth portion of the plurality of data packets and a packet size threshold, the fourth portion of the plurality of data;
   blocking, based on respective content of each data packet of a fifth portion of the plurality of data packets indicating a restricted content type, the fifth portion of the plurality of data packets;
   causing, based on a destination address of other data packets of the plurality of data packets, the other data packets to be sent to a user device; and
   causing, based on traffic profile information and a parameter indicated by a header of a data packet of the other data packets, the user device to block the data packet.

2. The computer-implemented method of claim 1, wherein the determining the respective source address for each data packet of the plurality of data packets comprises receiving an indication of the respective source address for each data packet of the plurality of data packets from a network routing device.

3. The computer-implemented method of claim 1, wherein blocking the first portion of the plurality of data packets comprises sending a control message to a network routing device that received the plurality of data packets that causes the network routing device to block the first portion of the plurality of data packets.

4. The computer-implemented method of claim 1, wherein blocking the second portion of the plurality of data packets comprises sending data rate limiting instructions to a network device that cause the network device to block received data packets that indicate the source address after the communication request threshold is satisfied.

5. The computer-implemented method of claim 1, wherein blocking the third portion of the plurality of data packets comprises sending the access control list to a network device configured to block received data packets that comprise a destination address that is not indicated by the access control list.

6. The computer-implemented method of claim 1, wherein blocking the fourth portion of the plurality of data packets comprises sending, to a network device, instructions to:
   remove a token from an amount of tokens in a bucket for each data packet received that exceeds the packet size threshold; and
   block, based on the amount of tokens remaining in the bucket being less than a token count threshold, the fourth portion of the plurality of data packets.

7. The computer-implemented method of claim 1, wherein blocking the fifth portion of the plurality of data packets comprises sending, to a network device, an indication of the restricted content type, wherein the network device configured to:
   determine, based on a respective header for each data packet of the fifth portion of the plurality of data packets, the respective content; and
   block, based on the respective content of each data packet of the fifth portion of the plurality of data packets indicating a restricted content type, the fifth portion of the plurality of data packets.

8. The computer-implemented method of claim 1, wherein the causing the user device to block the data packet comprises sending the traffic profile information to the user device, wherein the traffic profile information indicates at least one of a prohibited protocol or a prohibited port number, and the user device is configured to:
   determine, based on the header on the data packet, the parameter; and
   block, based on the parameter indicating the prohibited protocol or the prohibited port number, the data packet.

9. A non-transitory computer-readable medium having instructions stored thereon that, when executed by at least one computing device, causes at least one computing device to perform operations for mitigating malicious network traffic, comprising:
   determining a respective source address for each data packet of a plurality of data packets;
   blocking, based on the respective source address for each data packet of a first portion of the plurality of data packets indicating a prohibited source address, the first portion of the plurality of data packets;

blocking, based on a source address indicated by each data packet of a second portion of the plurality of data packets and a communication request threshold, the second portion of the plurality of data packets;

blocking, based on a respective destination address of each data packet of a third portion of the plurality of data packets and an access control list, the third portion of the plurality of data packets;

blocking, based on a respective size of each data packet of a fourth portion of the plurality of data packets and a packet size threshold, the fourth portion of the plurality of data packets;

blocking, based on respective content of each data packet of a fifth portion of the plurality of data packets indicating a restricted content type, the fifth portion of the plurality of data packets;

causing, based on a destination address of other data packets of the plurality of data packets, the other data packets to be sent to a user device; and causing, based on traffic profile information and a parameter indicated by a header of a data packet of the other data packets, the user device to block the data packet.

10. The non-transitory computer-readable medium of claim 9, wherein the determining the respective source address for each data packet of the plurality of data packets comprises receiving an indication of the respective source address for each data packet of the plurality of data packets from a network routing device.

11. The non-transitory computer-readable medium of claim 9, wherein blocking the first portion of the plurality of data packets comprises sending a control message to a network routing device that received the plurality of data packets that causes the network routing device to block the first portion of the plurality of data packets.

12. The non-transitory computer-readable medium of claim 9, wherein blocking the second portion of the plurality of data packets comprises sending data rate limiting instructions to a network device that cause the network device to block received data packets that indicate the source address after the communication request threshold is satisfied.

13. The non-transitory computer-readable medium of claim 9, wherein blocking the third portion of the plurality of data packets comprises sending the access control list to a network device configured to block received data packets that comprise a destination address that is not indicated by the access control list.

14. The non-transitory computer-readable medium of claim 9, wherein blocking the fourth portion of the plurality of data packets comprises sending, to a network device, instructions to:
  remove a token from an amount of tokens in a bucket for each data packet received that exceeds the packet size threshold; and
  block, based on the amount of tokens remaining in the bucket being less than a token count threshold, the fourth portion of the plurality of data packets.

15. The non-transitory computer-readable medium of claim 9, wherein blocking the fifth portion of the plurality of data packets comprises sending, to a network device, an indication of the restricted content type, wherein the network device configured to:
  determine, based on a respective header for each data packet of the fifth portion of the plurality of data packets, the respective content; and
  block, based on the respective content of each data packet of the fifth portion of the plurality of data packets indicating a restricted content type, the fifth portion of the plurality of data packets.

16. The non-transitory computer-readable medium of claim 9, wherein the causing the user device to block the data packet comprises sending the traffic profile information to the user device, wherein the traffic profile information indicates at least one of a prohibited protocol or a prohibited port number, and the user device is configured to:
  determine, based on the header on the data packet, the parameter; and
  block, based on the parameter indicating the prohibited protocol or the prohibited port number, the data packet.

17. A system for mitigating malicious network traffic, comprising:
  a memory; and
  at least one processor coupled to the memory and configured to perform operations comprising:
  determining a respective source address for each data packet of a plurality of data packets;
  blocking, based on the respective source address for each data packet of a first portion of the plurality of data packets indicating a prohibited source address, the first portion of the plurality of data packets;
  blocking, based on a source address indicated by each data packet of a second portion of the plurality of data packets and a communication request threshold, the second portion of the plurality of data packets;
  blocking, based on a respective destination address of each data packet of a third portion of the plurality of data packets and an access control list, the third portion of the plurality of data packets;
  blocking, based on a respective size of each data packet of a fourth portion of the plurality of data packets and a packet size threshold, the fourth portion of the plurality of data packets;
  blocking, based on respective content of each data packet of a fifth portion of the plurality of data packets indicating a restricted content type, the fifth portion of the plurality of data packets;
  causing, based on a destination address of other data packets of the plurality of data packets, the other data packets to be sent to a user device; and
  causing, based on traffic profile information and a parameter indicated by a header of a data packet of the other data packets, the user device to block the data packet.

18. The system of claim 17,
  wherein determining the respective source address for each data packet of the plurality of data packets comprises receiving an indication of the respective source address for each data packet of the plurality of data packets from a network routing device, and
  wherein blocking the first portion of the plurality of data packets comprises sending a control message to a network routing device that received the plurality of data packets that causes the network routing device to block the first portion of the plurality of data packets.

19. The system of claim 17,
  wherein blocking the second portion of the plurality of data packets comprises sending data rate limiting instructions to a network device that cause the network device to block received data packets that indicate the source address after the communication request threshold is satisfied, and
  wherein blocking the third portion of the plurality of data packets comprises sending the access control list to a network device configured to block received data packets that comprise a destination address that is not indicated by the access control list.

20. The system of claim 17, wherein blocking the fourth portion of the plurality of data packets comprises sending, to a network device, instructions to:
  remove a token from an amount of tokens in a bucket for each data packet received that exceed a packet size threshold; and
  block, based on the amount of tokens remaining in the bucket being less than a token count threshold, the fourth portion of the plurality of data packets.

* * * * *

UNITED STATES PATENT AND TRADEMARK OFFICE
CERTIFICATE OF CORRECTION

| | | |
|---|---|---|
| PATENT NO. | : 12,381,898 B2 | Page 1 of 1 |
| APPLICATION NO. | : 17/719071 | |
| DATED | : August 5, 2025 | |
| INVENTOR(S) | : Eddie Rueffer | |

It is certified that error appears in the above-identified patent and that said Letters Patent is hereby corrected as shown below:

In the Drawings

At figure 3, and on the title page, the illustrative print figure, for Tag "308", Line 2, "BASED" should be -- BASED ON --.

At figure 3, and on the title page, the illustrative print figure, for Tag "308", Line 4, "INFORMATION" should be -- PARAMETER --.

In the Claims

At Column 19, Line 57, "data;" should be -- data packets; --.

Signed and Sealed this
Sixteenth Day of December, 2025

John A. Squires
*Director of the United States Patent and Trademark Office*